US008316827B2

(12) United States Patent
Miyamoto et al.

(10) Patent No.: US 8,316,827 B2
(45) Date of Patent: Nov. 27, 2012

(54) ENGINE INTAKE QUANTITY CONTROL APPARATUS

(75) Inventors: Takeshi Miyamoto, Zama (JP); Takashi Nakazawa, Kawasaki (JP); Takao Kawasaki, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 424 days.

(21) Appl. No.: 12/628,392

(22) Filed: Dec. 1, 2009

(65) Prior Publication Data

US 2010/0154757 A1    Jun. 24, 2010

(30) Foreign Application Priority Data

Dec. 19, 2008  (JP) ................................. 2008-323333
Sep. 24, 2009  (JP) ................................. 2009-219266

(51) Int. Cl.
*F02B 33/00* (2006.01)
*F02B 47/08* (2006.01)
*F01L 1/34* (2006.01)
*F02M 25/07* (2006.01)

(52) U.S. Cl. .............. 123/559.1; 123/90.15; 123/568.14

(58) Field of Classification Search .................. 123/561, 123/564–565, 559.1, 90.15, 90.17, 568.21, 123/568.14; 60/605.2
See application file for complete search history.

(56) References Cited

U.S. PATENT DOCUMENTS

| 4,470,394 | A | * | 9/1984 | Tadokoro et al. | .......... 123/559.1 |
| 4,498,429 | A | * | 2/1985 | Satow et al. | .................. 123/564 |
| 4,958,606 | A | * | 9/1990 | Hitomi et al. | .............. 123/90.15 |
| 5,203,311 | A | * | 4/1993 | Hitomi et al. | ................ 60/605.2 |
| 5,421,296 | A | * | 6/1995 | Hitomi et al. | .............. 123/90.17 |
| 5,427,078 | A | * | 6/1995 | Hitomi et al. | .............. 123/90.15 |
| 6,055,948 | A | * | 5/2000 | Shiraishi et al. | ........... 123/90.15 |
| 6,293,246 | B1 | * | 9/2001 | Tanahashi et al. | ....... 123/568.21 |
| 6,338,245 | B1 | * | 1/2002 | Shimoda et al. | ................ 60/285 |
| 6,751,957 | B2 | * | 6/2004 | Morgan et al. | ................ 123/565 |
| 6,817,349 | B2 | * | 11/2004 | Awasaka et al. | .............. 123/564 |

(Continued)

FOREIGN PATENT DOCUMENTS

JP    2004245104 A  *  9/2004

(Continued)

OTHER PUBLICATIONS

An English translation of the Chinese Office Action of corresponding Chinese Application No. 200910259424.9, issued on Jun. 13, 2012.

(Continued)

*Primary Examiner* — Thai Ba Trieu
(74) *Attorney, Agent, or Firm* — Global IP Counselors, LLP (57) ABSTRACT

An engine intake air quantity control apparatus is provided with a throttle valve, a supercharger, a variable intake valve operating device and an intake air control device. The throttle valve varies an intake air flow passage area of an intake passage. The supercharger supercharges intake air. The variable intake valve operating device changes an intake valve timing of an intake valve in accordance with an engine operating state. The intake air control device increases an opening degree of the throttle valve in accordance with a detected increase of an accelerator pedal depression amount, and increases an intake air quantity by starting to supercharge the intake air with the supercharger upon a prescribed throttle valve opening degree having been reached. The intake air control device changes the prescribed throttle valve opening degree in accordance with the intake valve timing of the intake valve.

6 Claims, 9 Drawing Sheets

U.S. PATENT DOCUMENTS

| | | | |
|---|---|---|---|
| 6,840,235 B2 * | 1/2005 | Koseki et al. | 123/568.14 |
| 7,134,420 B2 * | 11/2006 | Miyashita | 123/299 |
| 7,415,966 B2 * | 8/2008 | Irisawa | 123/431 |
| 7,921,944 B2 * | 4/2011 | Russell et al. | 123/559.1 |
| 8,006,495 B2 * | 8/2011 | Igarashi et al. | 60/608 |
| 8,036,806 B2 * | 10/2011 | Nakamura | 123/559.1 |
| 2003/0066510 A1 * | 4/2003 | Kuboshima et al. | 123/568.12 |
| 2003/0160455 A1 * | 8/2003 | Hu et al. | 290/40 C |
| 2009/0050119 A1 * | 2/2009 | Inoue | 123/564 |
| 2010/0242901 A1 * | 9/2010 | Seto et al. | 123/299 |
| 2011/0270499 A1 * | 11/2011 | Saito | 701/55 |

FOREIGN PATENT DOCUMENTS

| | | |
|---|---|---|
| JP | 2005-76498 A | 3/2005 |
| JP | 2005-194960 | 7/2005 |
| JP | 2006-283754 | 10/2006 |
| JP | 2007247434 A * | 9/2007 |

OTHER PUBLICATIONS

An English translation of the Japanese Office Action of corresponding Japanese Application No. JP 2009-219266, dated Aug. 14, 2012, mailed Aug. 21, 2012.

* cited by examiner

ENGINE INTAKE QUANTITY CONTROL APPARATUS

CROSS-REFERENCE TO RELATED APPLICATIONS

This application claims priority to Japanese Patent Application No. 2008-323333, filed on Dec. 19, 2008 and Japanese Patent Application No. 2009-219266, filed on Sep. 24, 2009. The entire disclosures of Japanese Patent Application Nos. 2008-323333 and 2009-219266 are hereby incorporated herein by reference.

BACKGROUND OF THE INVENTION

1. Field of the Invention

The present invention generally relates to an apparatus that control an intake quantity of a supercharged engine. More specifically, the present invention relates to an engine intake quantity control apparatus that controls output torque of a supercharged engine.

2. Background Information

One example of an engine intake quantity control apparatus is disclosed in Japanese Laid-Open Patent Publication No. 2005-76498. This publication discloses an engine intake quantity control apparatus that controls an intake air quantity supplied to a supercharged engine by combining a throttle control and a supercharge pressure control. The throttle control is configured to control an intake air quantity by adjusting an opening degree of a throttle valve. The supercharge pressure control is configured to control an intake air quantity by adjusting a supercharge pressure produced by a supercharger.

Sometimes when a vehicle moves from a flat road to an inclined road, the engine rotational speed will not increase and, instead, remains constant even though the driver is depressing the accelerator pedal. When the engine rotational speed is constant and the opening degree of the throttle valve has reached a saturation throttle valve opening degree, the intake air quantity will not increase even if the throttle valve opening degree is increased. In view of this issue, the intake quantity control apparatus presented in the aforementioned publication is configured to switch from using the throttle control to control the intake air quantity to using the supercharge pressure control to control the intake air quantity when the throttle valve opening degree has exceeded the threshold throttle valve opening degree.

SUMMARY OF THE INVENTION

With the intake quantity control apparatus described in the aforementioned publication, the saturation throttle valve opening degree is determined based solely on an engine rotational speed and a target throttle valve opening degree and a target pressure ratio are set based on an accelerator pedal depression amount and an engine rotational speed. However, since an internal pressure of a collector varies depending on the valve timings of an intake valve and an exhaust valve, the saturation throttle valve opening degree varies depending on the operating states of the valves as well as the engine rotational speed. In a supercharged engine with variable valve timings for the intake valves and the exhaust valves, if a target throttle valve opening degree and a target pressure ratio are set based on an accelerator pedal depression amount and an engine rotational speed in the manner of the aforementioned publication, then, depending on a valve operating state, a change in torque resulting from starting supercharging may be so large that a smooth change of output torque cannot be accomplished.

In view of the state of the known technology, one object is to provide an intake quantity control apparatus for a supercharged engine that can change an output torque smoothly.

In accordance with one aspect, an engine intake air quantity control apparatus is provided that mainly comprises a throttle valve, a supercharger, a variable intake valve operating device and an intake air control device. The throttle valve varies an intake air flow passage area of an intake passage. The supercharger supercharges intake air. The variable intake valve operating device changes an intake valve timing of an intake valve in accordance with an engine operating state. The intake air control device increases an opening degree of the throttle valve in accordance with a detected increase of an accelerator pedal depression amount, and increases an intake air quantity by starting to supercharge the intake air with the supercharger upon a prescribed throttle valve opening degree having been reached. The intake air control device changes the prescribed throttle valve opening degree in accordance with the intake valve timing of the intake valve.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
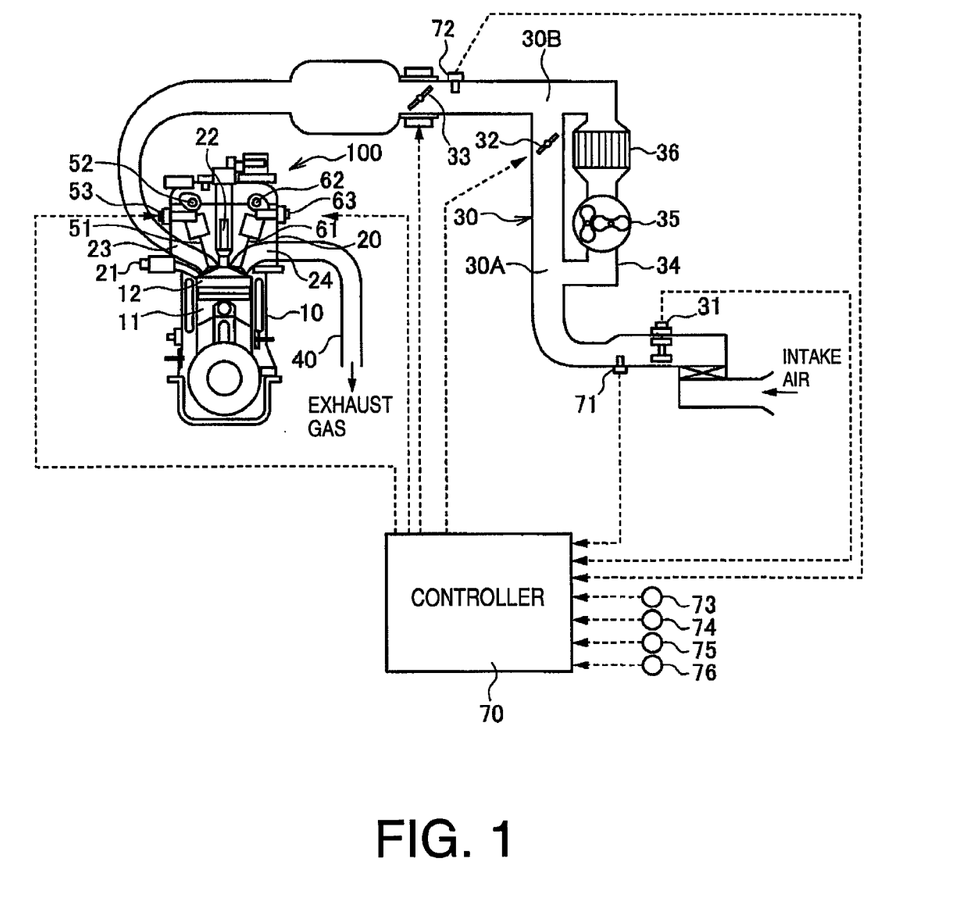
FIG. 1 is a schematic view of a supercharged engine with an engine intake quantity control apparatus in accordance with a first embodiment.

Referring initially to FIG. 1, a supercharged engine 100 is schematically illustrated in accordance with a first embodiment. As shown in FIG. 1, the supercharged vehicle engine 100 has a cylinder block 10 and a cylinder head 20 arranged above the cylinder block 10. In this illustrated embodiment, the supercharged engine 100 is a multi-cylinder inline engine for a vehicle. However, only one cylinder will be illustrated in detail for the sake of brevity. The cylinder block 10 has a plurality of cylinders (only one shown) with a piston 11 slidably arranged in each cylinder. A combustion chamber 12 is formed by a top surface of the piston 11, a cylinder wall surface and a bottom surface of the cylinder head 20 for each cylinder. When an air-fuel mixture is combusted inside the combustion chamber 12, a resulting combustion pressure causes the piston 11 to move reciprocally inside the cylinder in a conventional manner.

The cylinder head 20 is equipped with a fuel injection valve 21, a spark plug 22, an intake port 23 and an exhaust port 24. The fuel injection valve 21 is arranged to inject fuel directly into the combustion chamber 12. The spark plug 22 is arranged to ignite an air-fuel mixture in the combustion chamber 12. The intake port 23 supplies intake air to the combustion chamber 12, while the exhaust port 24 discharges exhaust gas from the combustion chamber 12. The intake port 23 is connected to an intake passage 30 that carries intake air inducted from outside and into the engine 100. The exhaust port 24 is connected to an exhaust passage 40 for discharging the exhaust gas from the engine 100 to the outside.

The intake passage 30 is equipped with an airflow meter 31, a supercharge control valve 32, a throttle valve 33 and a bypass passage 34. The bypass passage 34 is arranged to branch from the intake passage 30 at a branch portion 30A and reconnect at a merge portion 30B. The airflow meter 31 is provided in the intake passage 30 at a position upstream of the branch portion 30A. The airflow meter 31 is a hot-wire type airflow meter that serves to detect a flow rate of intake air supplied to the supercharged engine 100. The supercharged control valve 32 is provided in the intake passage 30 between the branch portion 30A and the merge portion 30B. The supercharge control valve 32 opens and closes the intake passage 30 in accordance with an engine operating state. The throttle valve 33 is arranged in the intake passage 30 at a position downstream of the merge portion 30B. The throttle valve 33 serves to adjust a quantity of intake air introduced into the supercharged engine 100 by varying an intake air flow area of the intake passage 30.

A supercharger 35 and an intercooler 36 are provided in the bypass passage 34. The supercharger 35 is a Roots type supercharger driven by a crankshaft and serves to supercharge intake air flowing through the bypass passage 34 in accordance with an engine operating state. The supercharge pressure of the intake air supercharged by the supercharger 35 is adjusted by controlling an opening degree of the supercharge control valve 32. It is also acceptable for the supercharger 35 to be driven by an electric motor or the like. The intercooler 36 is arranged in the bypass passage 34 downstream of the supercharger 35. The intercooler 36 serves to cool the intake air that has been compressed and raised to a high temperature by the supercharger 35.

An intake valve 51 is provided in the intake port 23. The intake valve 51 is driven by a cam formed integrally on an intake camshaft 52. The intake valve 51 serves to open and close the intake port 23 in accordance with the reciprocal motion of the piston 11. A valve timing of the intake valve 51 is adjusted by a variable intake valve operating device 53 (hereinafter called "intake VTC"). The intake VTC 53 changes a phase angle of the intake camshaft 52 with respect to the crankshaft using a hydraulic control.

An exhaust valve 61 is provided in the exhaust port 24. The exhaust valve 61 is driven by a cam formed integrally on an exhaust camshaft 62 and serves to open and close the exhaust port 24 in accordance with the reciprocal motion of the piston 11. A valve timing of the exhaust valve 61 is adjusted by a variable exhaust valve operating device 63 (hereinafter called "exhaust VTC"). The exhaust VTC 63 changes a phase angle of the exhaust camshaft 62 with respect to the crankshaft using a hydraulic control.

The supercharge control valve 32, the throttle valve 33, the intake VTC 53 and the exhaust VTC 63 are controlled by a controller 70. The controller 70 constitutes an intake air control device that changes a prescribed throttle valve opening degree in accordance with the intake valve timing of the intake valve 51. As explained below, the controller 70 (intake air control device) increases an opening degree of the throttle valve 33 in accordance with an increase of an accelerator pedal depression amount and increases an intake air quantity by starting to supercharge the intake air with the supercharger 35 when a prescribed throttle valve opening degree has been reached.

The controller 70 is a microcomputer comprising a central processing unit (CPU), a read only memory (ROM), a random access memory (RAM), and an input/output interface (I/O interface). The controller 70 receives detection data in the form of input signals from an atmospheric pressure sensor 71 serving to detect an atmospheric pressure, a supercharge pressure sensor 72 serving to detect a supercharge pressure, a crank angle sensor 73 serving to produce a crank angle signal each time the crankshaft rotates by a prescribed crank angle, an accelerator pedal sensor 74 serving to detect a depression amount of an accelerator pedal, an intake cam angle sensor 75 serving to detect a cam angle of the intake camshaft 52, an exhaust cam angle sensor 76 serving to detect a cam angle of the exhaust camshaft 62. Based on the input signals, the controller 70 controls (adjusts) the opening degree of the supercharge control valve 32, the opening degree of the throttle valve 33, and the valve timings of the intake and exhaust valves 51 and 61.

With the illustrated engine intake quantity control apparatus, since the prescribed throttle valve opening degree at which supercharging of the intake air by the supercharger 35 starts is changed in accordance with the intake valve timing of the intake valve 51, the intake air quantity can be changed smoothly in accordance with the accelerator pedal depression amount and the output torque of the supercharged engine 100 can be changed smoothly even if the operating state of the intake valve changes.

The operating state of the supercharged engine 100 will now be explained with reference to FIGS. 2A, 2B, 3A, 3B and 3C.

Figure 2A:
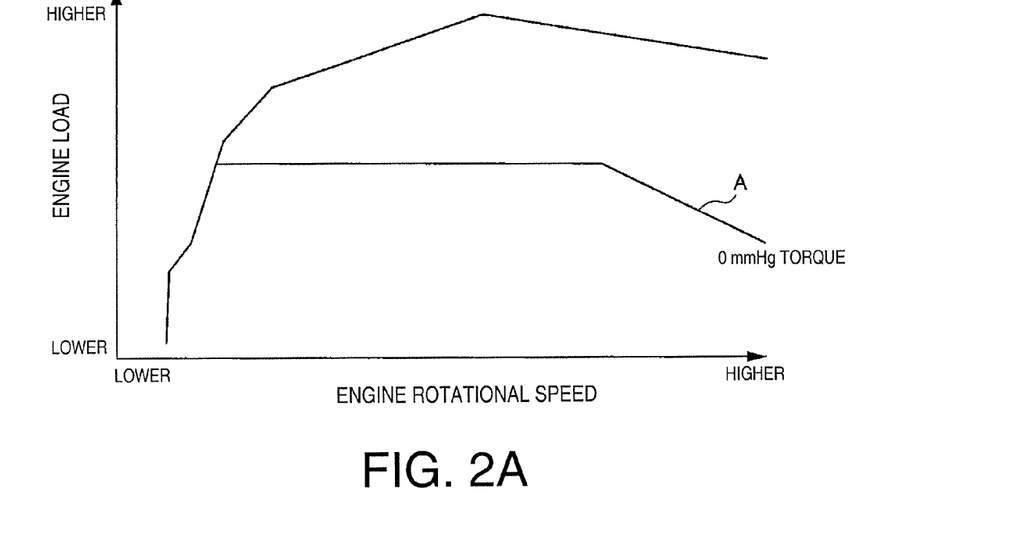
FIG. 2A is a characteristic graph for explaining an operating state of the supercharged engine occurring when the engine is cool.
Figure 2B:
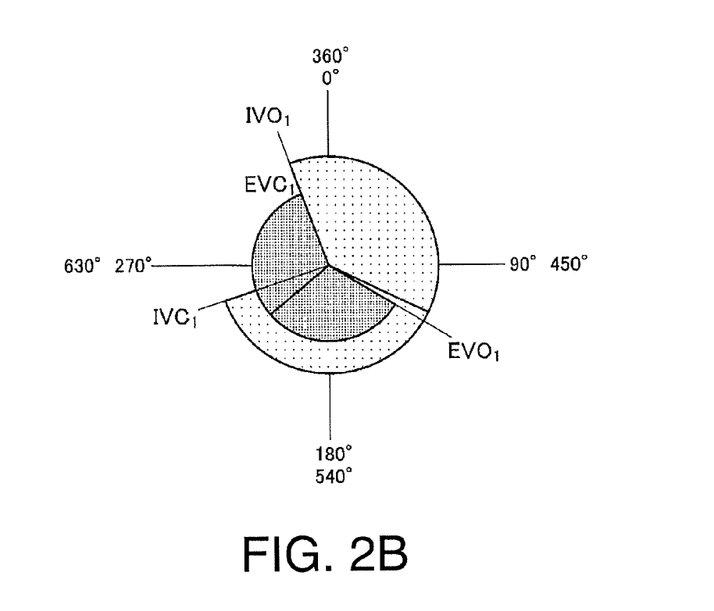
FIG. 2B is a timing diagram for explaining an operating state of the supercharged engine occurring when the engine is cool.

The supercharged engine 100 is operated according to the operation map shown in FIG. 2A when it is cold. In this the supercharged engine 100, the supercharger 35 of executes supercharging when the engine load is higher than a supercharge boundary line A. When the engine 100 is cold, the valve timings of the intake valve 51 and the exhaust valve 61 are set to a first intake valve timing and a first exhaust valve timing as shown in FIG. 2B. The engine 100 is operated according to a Miller cycle across all operation regions (all engine loads and engine speeds).

With the first exhaust valve timing shown in FIG. 2B, the exhaust valve 61 opens at a prescribed timing $EVO_1$ occurring before bottom dead center during the power stroke and closes at a prescribed timing $EVC_1$ occurring before top dead center during the exhaust stroke. Meanwhile, with the first intake valve timing shown in FIG. 2B, the intake valve 51 opens at a prescribed timing $IVO_1$ occurring before top dead center during the exhaust stroke and closes at a prescribed timing $IVC_1$ occurring after bottom dead center of the intake stroke. By setting the valve close timing of the intake valve 51 to occur after the top dead center position of the intake stroke such that an actual compression ratio is decreased, the supercharged engine 100 is operated according to a Miller cycle with a so-called retarded closing of the intake valve.

Figure 3A:
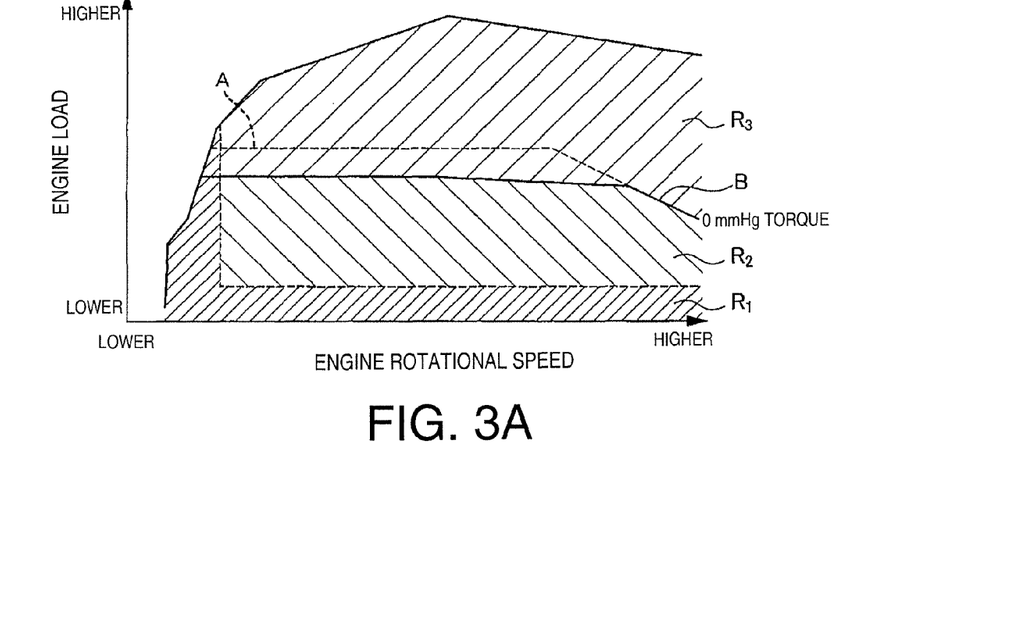
FIG. 3A is a characteristic graph for explaining an operating state of the supercharged engine occurring when the engine is warm.

The supercharged engine 100 is operated according to the operation map shown in FIG. 3A when it is warm.

The operation map of FIG. 3A is divided into three regions. The first region is a low rotational speed and low load region $R_1$ that encompasses low engine speeds and low engine loads. The second region is a load region $R_2$ that encompasses engine loads lower than a supercharge boundary line B. The third region is a supercharge region $R_3$ that encompasses engine loads higher than the supercharge boundary line B. The supercharge boundary line B for a warm engine is shifted to a lower engine load than the supercharge boundary line A (broken line) for a cold engine as seen in FIG. 3A. In the low rotational speed and low load region $R_1$, the intake valve 51 and the exhaust valve 61 are set to the same first valve timings as when the engine is cold. In the supercharge region $R_3$, the valve timings of the intake valve 51 and the exhaust valve 61 are set to a third valve timing shown in FIG. 3B with the engine 100 operating according to a Miller cycle.

Figure 3B:
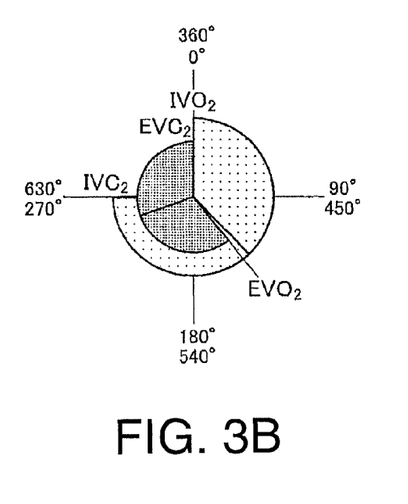
FIG. 3B is a timing diagram for explaining an operating state of a supercharged engine occurring when the engine is warm.

The third valve timings of the intake valve 51 and the exhaust valve 61 shown in FIG. 3B are set to be more retarded than the aforementioned first valve timings. The exhaust valve 61 opens at a prescribed timing $EVO_2$ occurring before bottom dead center of the power stroke and closes at a prescribed timing $EVC_2$ occurring at the top dead center position of the exhaust stroke. Meanwhile, the intake valve 51 opens at a prescribed timing $IVO_2$ occurring at the top dead center position of the exhaust stroke, i.e., substantially the same timing as the exhaust valve close timing, and closes at a prescribed timing $IVC_2$ occurring 90° after bottom dead center of the intake stroke.

With the third valve timing, the intake valve 51 closes at an even later timing than with the first valve timing and the actual compression ratio decreases even further.

Figure 3C:
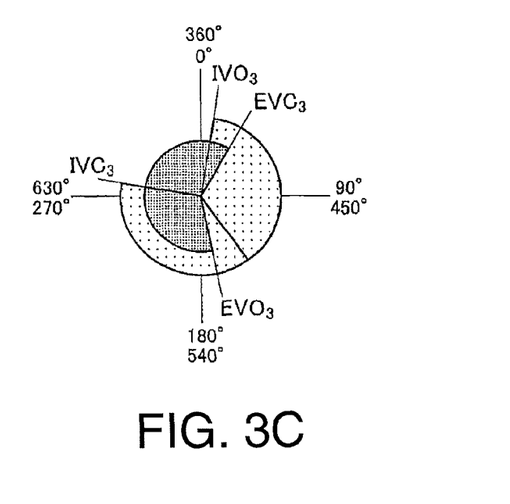
FIG. 3C is a timing diagram for explaining an operating state of a supercharged engine occurring when the engine is warm.

In the medium load region $R_2$, the valve timings of the intake valve 51 and the exhaust valve 61 are set to a second valve timing shown in FIG. 3C and the engine 100 is operated according to a Miller cycle.

The second valve timings of the intake valve 51 and the exhaust valve 61 shown in FIG. 3C are set to be more retarded than the aforementioned third valve timings. The exhaust valve 61 opens at a prescribed timing $EVO_3$ occurring before bottom dead center of the power stroke and closes at a prescribed timing $EVC_3$ occurring after top dead center of the exhaust stroke. The intake valve 51 opens at a prescribed timing $IVO_3$ occurring after top dead center of the exhaust stroke and closes at a prescribed timing $IVC_3$ occurring more than 90° after bottom dead center of the intake stroke.

With the second valve timing, the open duration of the intake valve 51 and the opening duration of the exhaust valve 61 overlap and a portion of the exhaust gas inside the exhaust port 24 is supplied to the combustion chamber 12 as internal EGR gas. Also, with the second valve timing, the intake valve 51 closes at an even later timing than with the third valve timing and the actual compression ratio decreases even further.

Sometimes when a vehicle moves from a flat road to an inclined road, the engine rotational speed will not increase and, instead, remains constant even though the driver is depressing the accelerator pedal. If the engine rotational speed is constant, then when the throttle valve opening degree has reached a saturation throttle valve opening degree, the intake air quantity will not increase even if the throttle valve opening degree is increased. With the supercharged engine described in the aforementioned Japanese Laid-Open Patent Publication No. 2005-76498, a target throttle valve opening degree and a target pressure ratio are set based on an accelerator pedal depression amount and an engine rotational speed while taking into account a relationship between the engine rotational speed and the saturation throttle valve opening degree.

However, the saturation throttle valve opening degree changes depending on the operating states of the intake valve and the exhaust valve.

Figure 4:
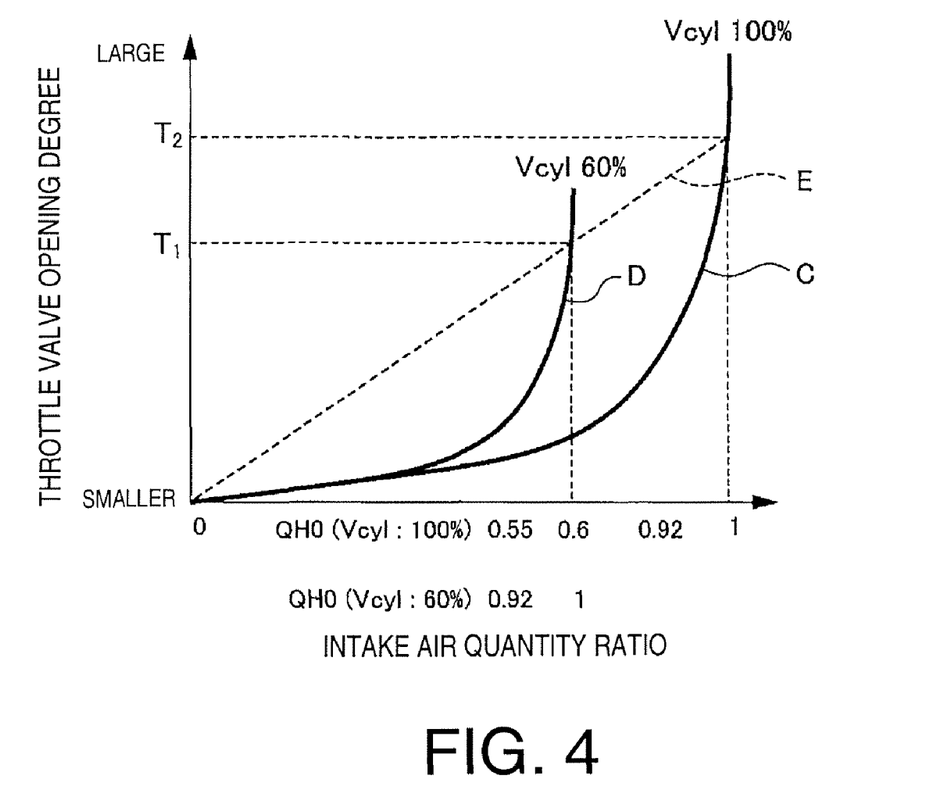
FIG. 4 is a characteristic graph that shows a throttle valve opening degree versus an intake air quantity ratio.

FIG. 4 shows a plot of a throttle valve opening degree versus an intake air quantity ratio of the supercharged engine 100. The intake air quantity ratio is a ratio of a quantity of intake air introduced into the cylinder with respect to an effective volume of the cylinder, i.e., a maximum quantity of intake air that can be introduced into the cylinder under naturally aspirated (NA) conditions. A curve C shown in the figure is an intake air quantity ratio characteristic corresponding to a prescribed operating point in the low rotational speed and low load region R1. A curve D shown in the figure is an intake air quantity ratio characteristic corresponding to a prescribed operating point in the medium load region R2. A broken line E shown in FIG. 4 is a line of equal boost pressure.

As shown in FIG. 4, the effective cylinder volume obtained when the second valve timing is used in the medium load region $R_2$ is approximately 60% of the effective cylinder volume (reference effective cylinder volume) obtained when the first valve timing is used in the low rotational speed and low load region $R_1$. When the effective cylinder volume changes in response to a change of the valve timings of the intake valve 51 and the exhaust valve 61, the saturation throttle valve opening ($T_1$ and $T_2$) beyond which the intake air quantity will not increase even if the throttle valve opening degree is increased also changes, as indicated by the curves C and D.

In the supercharged engine 100, the valve timings of the intake valve 51 and the exhaust valve 61 vary depending on the degree to which the engine has warmed up even if the operating point is the same. Likewise, the valve timings vary depending on the operating region after the engine has warmed up. Consequently, with the supercharged engine 100, if a target throttle valve opening degree and a target pressure ratio are set in a manner that takes into account a relationship between the engine rotational speed and the saturation throttle valve opening degree, then, depending on a valve operating state, a change in torque resulting from starting supercharging may be so large that a smooth change of output torque cannot be accomplished.

Therefore, in order to solve this problem, the intake air quantity control apparatus of the supercharged engine 100 in this embodiment sets a target throttle valve opening degree and a target pressure ratio in a manner that takes into account the valve operating states of the intake valve 51 and the exhaust valve 61, and controls the throttle valve 33 and the supercharge control valve 32 based on the set target throttle valve opening degree and target pressure ratio.

Figure 5:
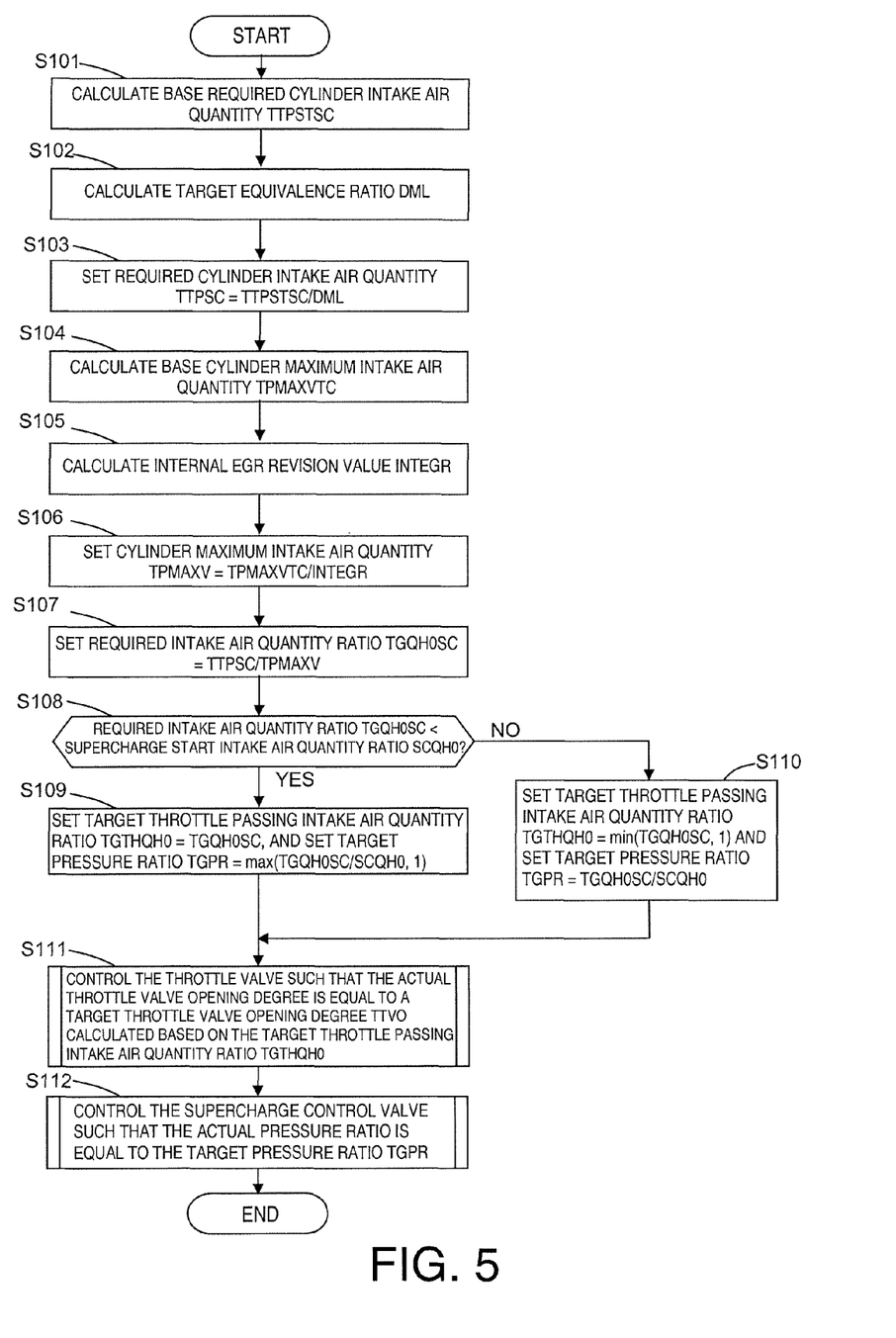
FIG. 5 is a flowchart for explaining a main routine executed by a controller.

FIG. 5 is a flowchart explaining a control routine executed by the controller 70. The control routine is repeatedly executed once per prescribed amount of time, e.g., every 10 milliseconds, while the engine 100 is running.

In step S101, the controller 70 uses a map (not shown) or the like to calculate a base required cylinder intake air quantity TTPSTSC based on an engine rotational speed and an accelerator pedal depression amount. The engine rotational speed is detected by the crank angle sensor 73 and the accelerator pedal depression amount is detected by the accelerator pedal sensor 74. The accelerator pedal depression amount represents an engine load of the supercharged engine 100.

In step S102, the controller 70 uses a map (not shown) or the like to calculate a target equivalence ratio DML based on an engine rotational speed and an accelerator pedal depression amount. The target equivalence ratio DML is a value obtained by dividing a stoichiometric air-fuel ratio by a target air-fuel ratio.

In step S103, the controller 70 calculates a required cylinder intake air quantity TTPSC by dividing the base required cylinder intake air quantity TTPSTSC by the target equivalence ratio DML. The required cylinder intake air quantity TTPSC is an intake air quantity required to achieve the target air-fuel ratio. The steps S101 to S103 constitute a required cylinder intake air quantity calculating section of the controller 70 (intake air control device).

Figure 6A:
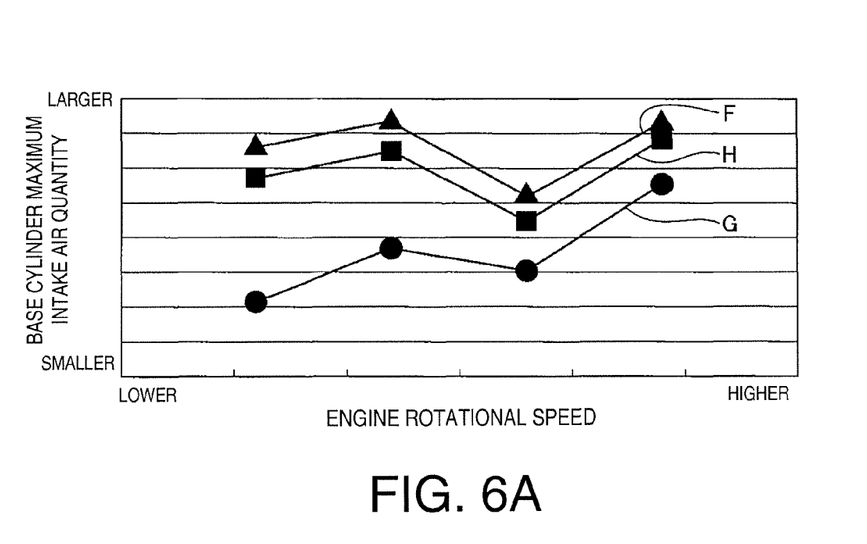
FIG. 6A is a graph of a base cylinder maximum intake air quantity characteristic and an internal EGR revision value characteristic.

In step S104, the controller 70 uses a map shown in FIG. 6A to calculate a base cylinder maximum intake air quantity TPMAXVTC based on the engine rotational speed and an intake valve timing of the intake valve 51. The intake valve timing of the intake valve 51 is calculated based on a cam angle detected by the intake cam angle sensor 75. The step S104 constitutes a cylinder maximum intake air quantity calculating section of the controller 70 (intake air control device).

In FIG. 6A, the curve F corresponds to when the intake valve 51 is controlled according to the first valve timing, the curve G corresponds to when the intake valve 51 is controlled according to the second valve timing, and the curve H corresponds to when the intake valve 51 is controlled according to the third valve timing.

Although in this embodiment the base cylinder maximum intake air quantity is calculated based on the engine rotational speed and the intake valve timing, it is acceptable to calculate the base cylinder maximum intake air quantity based on only the intake valve timing or based on the engine rotational speed, the intake valve timing, and the exhaust valve timing.

Figure 6B:
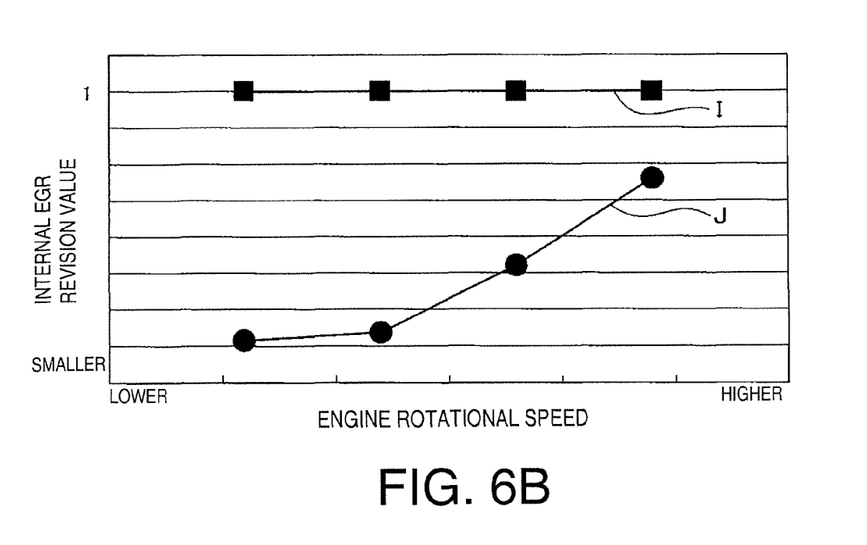
FIG. 6B is a graph of a base cylinder maximum intake air quantity characteristic and an internal EGR revision value characteristic.

In step S105, the controller 70 uses a map shown in FIG. 6B to calculate an internal EGR revision value INTEGR based on an engine rotational speed and an exhaust valve timing of the exhaust valve 61. The exhaust valve timing of the exhaust valve 61 is calculated based on a cam angle detected by the exhaust cam angle sensor 76.

In FIG. 6B, the curve I corresponds to when the exhaust valve 61 is controlled according to the third valve timing and the curve J corresponds to when the exhaust valve 61 is controlled according to the second valve timing.

Although in this embodiment the internal EGR revision value is calculated based on the engine rotational speed and the exhaust valve timing, it is acceptable to calculate the internal EGR revision value based on only the exhaust valve timing or based on the engine rotational speed, the intake valve timing, and the exhaust valve timing.

In step S106, the controller 70 calculates a cylinder maximum intake air quantity TPMAXV by multiplying the base cylinder maximum intake air quantity TPMAXVTC by the internal EGR revision value INTEGR.

In step S107, the controller 70 calculates a required intake air quantity ratio TGQH0SC by dividing the required cylinder intake air quantity TTPSC calculated in step S103 by the cylinder maximum intake air quantity TPMAXV calculated in step S106. The step S107 constitutes a required intake air quantity ratio calculating section of the controller 70 (intake air control device).

In step S108, the controller 70 determines if the required intake air quantity ratio TGQH0SC is smaller than a supercharge start intake air quantity ratio SCQH0. The supercharge start intake air quantity SCQH0 is a prescribed value set to be equal to or smaller than 1. If the required intake air quantity ratio TGQH0SC is smaller than the supercharge start intake air quantity ratio SCQH0, then the controller 70 executes step S109. Otherwise, the controller 70 executes step S110.

In step S109, the controller 70 sets the required intake air quantity ratio TGQH0SC as a target throttle passing intake air quantity ratio TGTHQH0. The controller 70 also divides the required intake air quantity ratio TGQH0SC by the supercharge start intake air quantity ratio SCQH0, compares the resulting value to 1, and sets the larger of the two values (resulting value or 1) as a target pressure ratio TGPR.

In step S110, the controller 70 compares the required intake air quantity ratio TGQH0SC to 1 and sets the smaller of the two values (TGQH0SC or 1) as a target throttle passing intake air quantity ratio TGTHQH0. The controller 70 also sets a value obtained by dividing the required intake air quantity ratio TGQH0SC by the supercharge start intake air quantity ratio SCQH0 as a target pressure ratio TGPR.

In step S111, the controller 70 calculates a target throttle valve opening degree TTVO based on the target throttle passing intake air quantity ratio TGTHQH0 and drives the throttle valve 33 such that the actual throttle valve opening degree becomes equal to the target throttle valve opening degree TTVO. The control of the throttle valve 33 will be explained later with reference to FIG. 8.

In step S112, the controller 70 drives the supercharge control valve 32 such that the actual pressure ratio becomes equal to the target pressure ratio TGPR. The actual pressure ratio is a value obtained by dividing a supercharge pressure detected by the supercharge pressure sensor 72 by an atmospheric pressure detected by the atmospheric pressure sensor 71. The steps S111 and S112 constitute a target valve setting section of the controller 70 (intake air control device).

Steps S108 to S112 will be explained in more detail with reference to FIG. 7.

Figure 7:
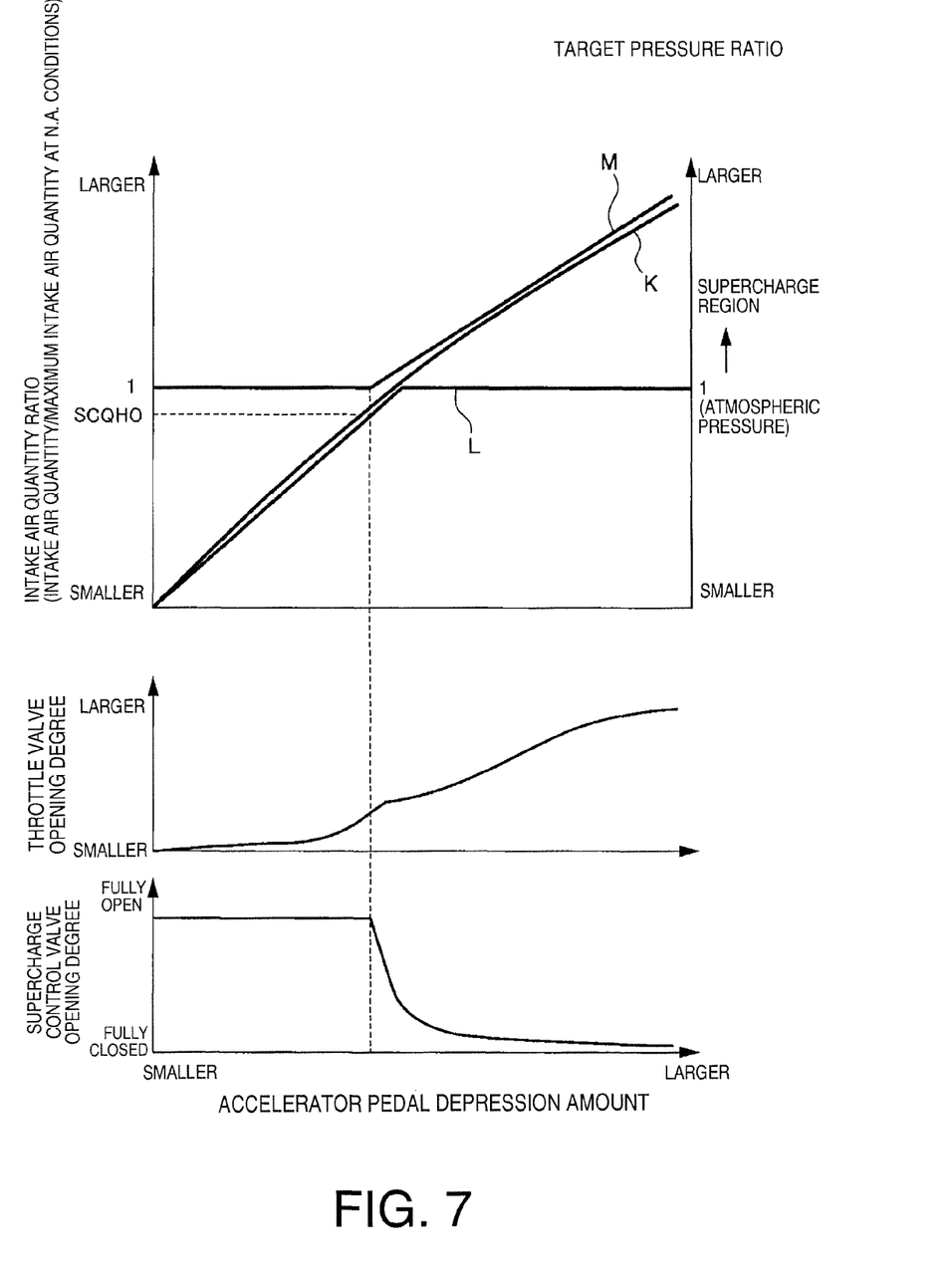
FIG. 7 is a series of graphs of an intake air quantity ratio and a target pressure ratio versus an accelerator pedal depression amount.

When a driver depresses the accelerator pedal, the required intake air quantity ratio TGQH0SC (which is calculated based on an accelerator pedal depression amount, an engine rotational speed, and the valve timings of the intake valve 51 and the exhaust valve 61) increases as indicated by the solid-line curve K in the upper graph of FIG. 7.

If the required intake air quantity ratio TGQH0SC is smaller than the supercharge start intake air quantity SCQH0 (which is set to a value equal to or smaller than 1), then the target throttle passing intake air quantity ratio TGTHQH0 is set to the required intake air quantity ratio TGQH0SC as indicated by the solid-line curve L and the target pressure ratio is set to 1 as indicated by the solid-line curve M.

The throttle valve 33 is opened based on the target throttle passing intake air quantity ratio TGTHQH0 as shown in the middle graph of FIG. 7, and the supercharge control valve 32 is opened fully based on the target pressure ratio TGPR as shown in the bottom graph of FIG. 7. If the required intake air quantity ratio TGQH0SC is smaller than the supercharge start intake air quantity ratio SCQH0, the throttle valve 33 is driven to control the intake air quantity supplied to the supercharged engine 100.

Conversely, if the required intake air quantity ratio TGQH0SC is larger than the supercharge start intake air quantity ratio SCQH0, the target throttle passing intake air quantity ratio TGTHQH0 is set to the required intake air quantity ratio TGQH0SC until the required intake air quantity ratio TGQH0SC becomes larger than 1, as indicated with the solid-line curve L. When the required intake air quantity ratio TGQH0SC has exceeded 1, target throttle passing intake air quantity ratio TGTHQH0 is set to 1. The target pressure ratio is set to a value obtained by dividing the required intake air quantity ratio TGQH0SC by the supercharge start intake air quantity ratio SCQH0, as indicated by the solid-line curve M.

The throttle valve 33 is opened based on the target throttle passing intake air quantity ratio TGTHQH0 as shown in the middle graph of FIG. 7, and the supercharge control valve 32 is closed based on the target pressure ratio TGPR as shown in the bottom graph of FIG. 7. If the required intake air quantity ratio TGQH0SC is larger than the supercharge start intake air quantity ratio SCQH0, then the supercharge control valve 32 is driven to control a supercharge pressure of the supercharger 35 and control an intake air quantity supplied to the supercharged engine 100. In other words, when the required intake air quantity ratio becomes larger than the supercharge start intake air quantity ratio, the throttle valve opening degree at that time is the saturation throttle valve opening degree.

Figure 8:
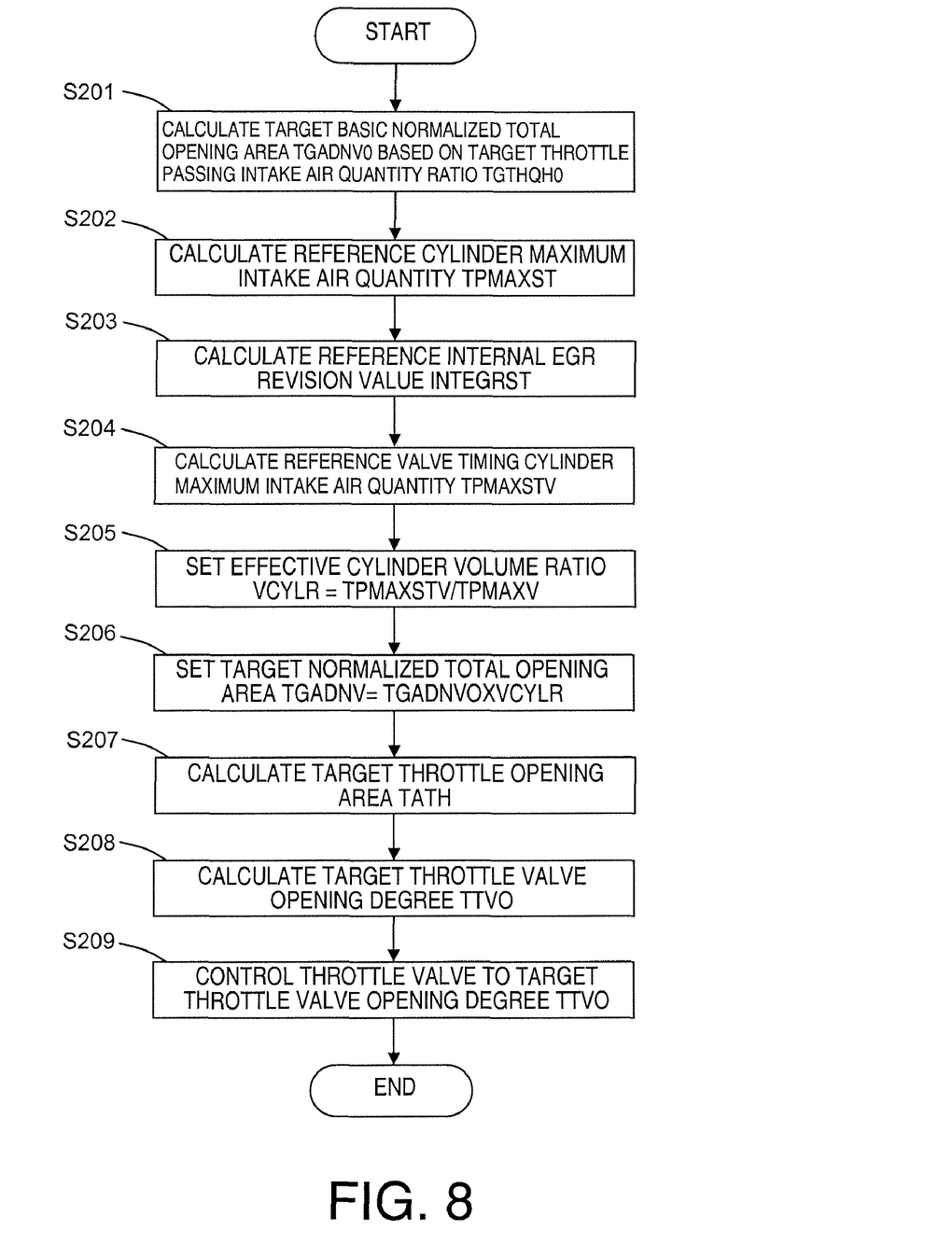
FIG. 8 is a flowchart explaining a subroutine executed by a controller.

A subroutine executed to control the throttle valve in step S111 of FIG. 5 will now be explained with reference to FIG. 8.

In step S201, the controller 70 calculates a target basic normalized total opening area TGADNV0 based on the target throttle passing intake air quantity ratio TGTHQH0.

In step S202, the controller 70 calculates a reference cylinder maximum intake air quantity TPMAXST based on an engine rotational speed and a reference intake valve timing. The reference intake valve timing is, for example, the intake valve timing of the aforementioned first valve timings. Therefore, the reference cylinder maximum intake air quantity TPMAXST can be obtained by referring to the curve F of FIG. 6A.

In step S203, the controller 70 calculates a reference internal EGR revision value INTEGRST based on an engine rotational speed and a reference exhaust valve timing. The reference exhaust valve timing is, for example, the exhaust valve timing of the aforementioned first valve timings. Therefore, the reference internal EGR revision value INTEGRST can be obtained by referring to the curve I of FIG. 6B.

In step S204, the controller 70 calculates a reference valve timing cylinder maximum intake air quantity TPMAXSTV by multiplying the reference cylinder maximum intake air quantity TPMAXST by the reference internal EGR revision value INTEGRST.

In step S205, the controller 70 calculates an effective cylinder volume ratio VCYLR by dividing the reference valve timing cylinder maximum intake air quantity TPMAXSTV by the cylinder maximum intake air quantity TPMAXV calculated in step S106 of FIG. 5.

In step S206, the controller 70 calculates a target normalized total opening area TGADNV by multiplying the target basic normalized total opening area TGADNV0 calculated in step S201 by the effective cylinder volume ratio VCYLR.

In step S207, the controller 70 calculates a target throttle opening area TATH based on an engine rotational speed, an exhaust quantity determined based on the particular engine, and the target normalized total opening area TGADNV.

In step S208, the controller calculates a target throttle valve opening degree TTVO based on the target throttle opening area TATH by referring to an opening area versus opening degree conversion table.

In step S209, the controller 70 drives the throttle valve 33 such that the actual throttle valve opening degree becomes equal to the target throttle valve opening degree TTVO.

Effects obtained with the intake quantity control apparatus of the supercharged engine 100 will now be explained.

The intake air quantity control apparatus of the supercharged engine 100 sets a target throttle valve opening degree and a target pressure ratio based on a required intake air quantity ratio calculated based on an accelerator pedal depression amount, an engine rotational speed, and valve timings of the intake valve 51 and the exhaust valve 61. More specifically, as shown in FIG. 6A, the more retarded the close timing of the intake valve is, the smaller the maximum intake air quantity of the cylinder becomes and the required intake air quantity ratio tends to increase. As a result, the supercharge control valve 32 is closed and supercharging is started at a stage when the required cylinder intake air quantity is smaller. In other words, the more retarded the close timing of the intake valve is, the smaller the saturation throttle valve opening degree is and the smaller the throttle valve opening degree is at which supercharging is started.

Figure 9:
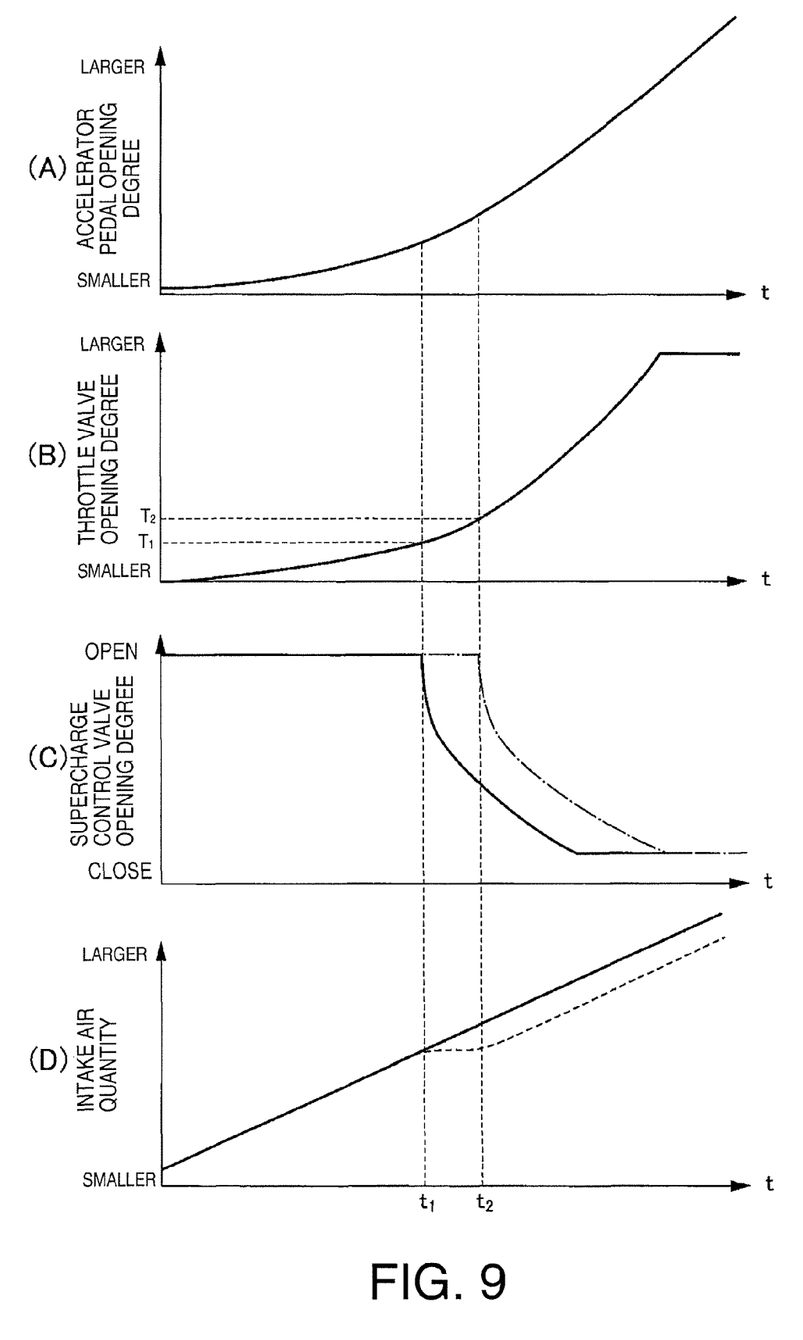
FIG. 9 is a series of graphs of illustrating how an intake air quantity changes with respect to an accelerator pedal depression amount.

FIG. 9 illustrates an example in which the accelerator pedal is depressed while the engine is warm and the operating point of the supercharged engine 100 moves from the medium load region R2 to the supercharge region R3.

As shown in graphs (A) and (B) of FIG. 9, as the accelerator pedal is depressed, at a time t1 the throttle valve opening degree reaches a saturation throttle valve opening degree T1 (see FIG. 4) of the medium region R2 and the supercharge control valve 32 is closed to start supercharging.

However, regardless of the acceleration from the medium load region $R_2$, if the supercharge control valve 32 is closed and supercharging is started at the saturation throttle valve opening degree $T_2$ (see FIG. 4) of the low rotational speed and low load region $R_1$ as indicated by the single-dot chain line in graph (C) of FIG. 9, then the intake air quantity will barely increase (as indicated by the broken line curve in graph (D) of FIG. 9) during a period from the time $t_1$ to a time $t_2$ corresponding to a period during which the throttle valve opening degree changes from $T_1$ to $T_2$. Consequently, the output torque of the supercharged engine 100 will not change smoothly in accordance with the accelerator pedal depression amount.

With the intake air quantity control device of the supercharged engine 100, when the throttle valve opening degree reaches the value T1 as indicated by the solid-line curve in graph (B) of FIG. 9, the supercharge control valve 32 is closed and supercharging is started as indicated by the solid-line curve in graph (C) of FIG. 9. As a result, as indicated by the solid-line curve in graph (D) of FIG. 9, the intake air quantity can be changed smoothly in accordance with the accelerator pedal depression amount.

When the valve open durations of the intake valve 51 and the exhaust valve 61 overlap as with the second valve timing shown characteristic in FIG. 3C and internal EGR gas is supplied to the combustion chamber 12, the quantity of intake air supplied to the cylinder decreases and, thus, the cylinder maximum intake air quantity decreases. As a result, the required intake air quantity ratio enters an increasing trend and the supercharge control valve 32 is closed and supercharging is started at a stage when the required cylinder intake air quantity is smaller. In other words, the larger the amount of internal EGR there is, the smaller the saturation throttle valve opening degree is and the smaller the throttle valve opening degree is at which supercharging is started.

Effects obtained with the intake air quantity control apparatus of the supercharged engine 100 as a result of the operation just described will now be explained.

With the intake air quantity control apparatus of the supercharged engine 100, a target throttle valve opening degree and a target pressure ratio are set based on a required intake air quantity ratio calculated based on an accelerator pedal depression amount, an engine rotational speed, and valve timings of the intake valve 51 and the exhaust valve 61. As a result, the intake air quantity can be changed smoothly in accordance with the accelerator pedal depression amount and the output torque of the supercharged engine 100 can be changed more smoothly.

Although in the embodiment the supercharged engine 100 is equipped with the supercharger 35, it is also acceptable to use a turbocharger instead of a supercharger. When a turbocharger is used, the supercharge pressure control is accomplished by controlling the opening degree of a waste gate valve.

Although the supercharged engine 100 is provided with an intake VTC 53 that controls the open and close timings of the intake valve 51, it is acceptable to use a variable valve operating device that controls a lift amount of the intake valve 51 in addition to the open and close timings. In such a case, in step S106 of FIG. 5, the cylinder maximum intake air quantity TPMAXV is calculated by multiplying the base cylinder maximum intake air quantity TPMAXVTC by both the internal EGR revision value INTEGR and a valve lift flow rate revision coefficient. The valve lift flow rate revision coefficient is calculated based on an engine rotational speed and a lift amount of the intake valve 51.

While only selected embodiments have been chosen to illustrate the present invention, it will be apparent to those skilled in the art from this disclosure that various changes and modifications can be made herein without departing from the scope of the invention as defined in the appended claims. For example, components that are shown directly connected or contacting each other can have intermediate structures disposed between them, unless otherwise specified. The functions of one element can be performed by two, and vice versa, unless otherwise specified. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine intake air quantity control apparatus comprising:
   throttle means for varying an intake air flow passage area of an intake passage;
   supercharging means for supercharging an intake air; and
   variable intake valve operating means for changing an intake timing of an intake valve in accordance with an engine load,
   intake air control means for increasing an opening degree of the throttle means in accordance with a detected increase of an accelerator pedal depression amount and for increasing an intake air quantity by starting to supercharge the intake air with the supercharging means upon a prescribed throttle valve opening degree having been reached, with the intake air control means changing the prescribed throttle valve opening degree in accordance with the intake valve timing of the intake valve.

2. An engine intake air quantity control apparatus comprising:
   a throttle valve that varies an intake air flow passage area of an intake passage;
   a supercharger that supercharges intake air;
   a variable intake valve operating device that changes an intake valve timing of an intake valve in accordance with an engine load; and
   an intake air control device that increases an opening degree of the throttle valve in accordance with a detected increase of an accelerator pedal depression amount and that increases an intake air quantity by starting to supercharge the intake air with the supercharger upon a prescribed throttle valve opening degree having been reached, with the intake air control device changing the prescribed throttle valve opening degree in accordance with the intake valve timing of the intake valve.

3. The engine intake air quantity control apparatus as recited in claim 2, wherein
   the intake air control device changes the prescribed throttle valve opening degree such that as a close timing of the intake valve becomes more retarded, the prescribed throttle valve opening degree becomes smaller.

4. The engine intake air quantity control apparatus as recited in claim 2, wherein
   the intake air control device sets the prescribed throttle valve opening degree to a saturation throttle valve opening degree beyond which the intake air quantity will not increase even if the throttle valve is opened further.

5. The engine intake air quantity control apparatus as recited in claim 2, further comprising
   a variable exhaust valve operating device that changes an exhaust valve timing of an exhaust valve in accordance with the engine load, and with the intake air control device inducing internal exhaust gas recirculation by opening the intake and exhaust valves for opening durations that overlap, and changing the prescribed throttle valve opening degree in accordance with an amount of internal EGR gas being recirculated as a result of the internal exhaust gas recirculation.

6. An engine intake air quantity control apparatus comprising:
   a throttle valve that varies an intake air flow passage area of an intake passage;
   a supercharger that supercharges intake air;
   a variable intake valve operating device that changes an intake valve timing of an intake valve in accordance with an engine operating state;
   an intake air control device that increases an opening degree of the throttle valve in accordance with a detected increase of an accelerator pedal depression amount and that increases an intake air quantity by starting to supercharge the intake air with the supercharger upon a prescribed throttle valve opening degree having been reached, with the intake air control device changing the prescribed throttle valve opening degree in accordance with the intake valve timing of the intake valve; and
   a variable exhaust valve operating device that changes an exhaust valve timing of an exhaust valve in accordance with the engine operating state, with the intake air control device inducing internal exhaust gas recirculation by opening the intake and exhaust valves for opening durations that overlap, and changing the prescribed throttle valve opening degree in accordance with an amount of internal EGR gas being recirculated as a result of the internal exhaust gas recirculation, the intake air control device further changing the prescribed throttle valve opening degree such that as the amount of the internal EGR gas becomes larger, the prescribed throttle valve opening degree becomes smaller.

* * * * *